J. SALTAR, Jr.
Loose Pulley.
No. 202,667. Patented April 23, 1878.
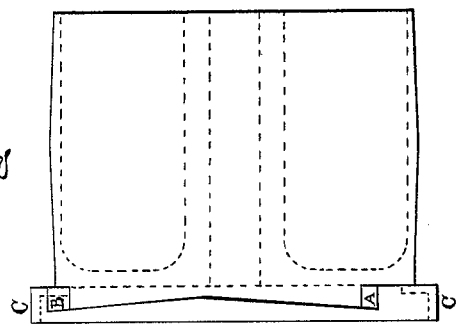
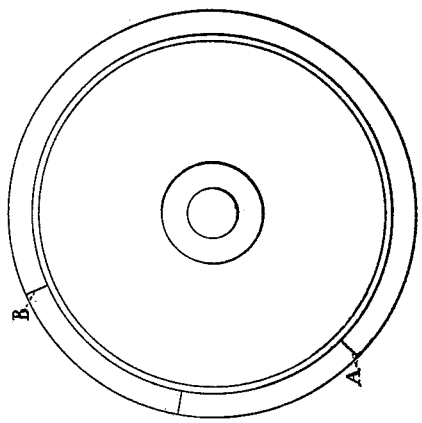
Witnesses
E. Burns
J.J. White
Inventor
J. Saltar Jr

UNITED STATES PATENT OFFICE.

JOHN SALTAR, JR., OF SMITHVILLE, NEW JERSEY, ASSIGNOR TO H. B. SMITH MACHINE COMPANY, OF SAME PLACE.

IMPROVEMENT IN LOOSE PULLEYS.

Specification forming part of Letters Patent No. 202,667, dated April 23, 1878; application filed April 5, 1878.

*To all whom it may concern:*

Be it known that I, JOHN SALTAR, Jr., of Smithville, in the county of Burlington and State of New Jersey, have invented a new and useful Improvement in Loose Pulleys, of which the following is a specification:

The invention relates to loose pulleys of smaller diameter than their adjacent tight pulleys, and to means of shifting the belt from one to the other.

Heretofore an inclined flange has been used for guiding the belt from a loose pulley to a tight pulley of larger diameter, also a shipper with an inclined support for the belt, the inclination being intended to guide the belt from the loose to the tight pulley.

The first method is objectionable because, when the difference in the diameters of the pulleys is great enough to slacken the belt, the inclined flange resists the effort to ship the belt, causing it to rise slowly, and to become stretched or elongated on one side; and, further, the belt, in passing from the inclined surface to the tight pulley, does not do so in the direction of the surface of the tight pulley, but runs upon the edge or angle formed by the junction of the surfaces of the incline and the tight pulley. This action, by bringing the full strain of the belt upon a narrow edge, also strains and loosens the substance of the belt, increasing its uncertain action in shipping.

The injurious effects of this arrangement have been found to outweigh any advantage derived from diminishing the size of the loose pulley. The inclined shipper is objectionable, because it diverts one side of the belt from its proper course, causing thereby a great amount of friction and wear upon the belt and lacing—so much, in fact, as to render its application impracticable.

The object of my invention is to provide means for shifting belts from loose pulleys to tight pulleys of larger diameter expeditiously and without injury to the belting.

The invention consists in arranging upon the loose pulley a projection or step, for the purpose of lifting the belt immediately upon its being actuated by the shipper.

It also further consists of a pulley-faced flange having the same diameter as the tight pulley, and arranged to receive the belt from the step or projection, and deliver it straight upon the face of the tight pulley.

In the accompanying drawing, in which similar letters of reference indicate like parts, Figure 1 is an end elevation, and Fig. 2 is a side elevation, of the device embodying my invention.

A and B represent the projections or steps designed to lift the belt upon the flange C in position to be quickly and easily shipped to the adjacent tight pulley. Two steps are provided, so that the belt may be readily shipped, without reference to the direction in which the pulley is rotating. It is evident, however, that one step only is sufficient to ship the belt if the pulley is rotated in the proper direction.

Having thus described my invention, I claim as new, and desire to secure by Letters Patent, the following:

1. The pulley-faced flange placed between a tight pulley and a loose pulley of lesser diameter, substantially as and for the purpose described.

2. One or more steps or projections upon a loose pulley, for the purpose of lifting the belt, substantially as described.

JOHN SALTAR, JR.

Witnesses:
E. F. BURNS,
J. J. WHITE.